(12) United States Patent  
Moore

(10) Patent No.: US 8,325,973 B2  
(45) Date of Patent: Dec. 4, 2012

(54) GENERATING DATA REPRESENTATIVE OF A FRAGMENTED DOCUMENT

(76) Inventor: Jason Lee Moore, Austin, TX (US)

( * ) Notice: Subject to any disclaimer, the term of this patent is extended or adjusted under 35 U.S.C. 154(b) by 864 days.

(21) Appl. No.: 12/347,451

(22) Filed: Dec. 31, 2008

(65) Prior Publication Data

US 2010/0166253 A1  Jul. 1, 2010

(51) Int. Cl.
*G06K 9/00* (2006.01)

(52) U.S. Cl. ........ 382/100; 382/181; 382/190; 382/199; 382/200; 382/224

(58) Field of Classification Search .................. 382/181, 382/190, 199, 200, 224
See application file for complete search history.

(56) References Cited

U.S. PATENT DOCUMENTS

| | | | | |
|---|---|---|---|---|
| 4,601,572 A | * | 7/1986 | Wise ........................ | 355/68 |
| 5,354,001 A | * | 10/1994 | Hasegawa .................. | 241/34 |
| 5,732,230 A | * | 3/1998 | Cullen et al. ............... | 715/764 |
| 6,155,604 A | * | 12/2000 | Greene et al. .............. | 283/70 |
| 6,650,791 B1 | * | 11/2003 | Cullen ....................... | 382/294 |
| 6,820,830 B1 | * | 11/2004 | Lassen et al. .............. | 241/186.3 |
| 7,099,522 B2 | * | 8/2006 | Anderson et al. ........... | 382/287 |
| 8,073,264 B2 | * | 12/2011 | Lin et al. .................... | 382/224 |
| 2002/0017577 A1 | * | 2/2002 | Rajewski ................... | 241/30 |
| 2003/0110991 A1 | * | 6/2003 | Wilkins ..................... | 110/219 |
| 2004/0074973 A1 | * | 4/2004 | Schneck et al. ............ | 235/488 |
| 2004/0205662 A1 | * | 10/2004 | Anderson et al. .......... | 715/530 |
| 2005/0038756 A1 | * | 2/2005 | Nagel ........................ | 705/76 |
| 2007/0110276 A1 | * | 5/2007 | O'Connell et al. ......... | 382/101 |
| 2007/0115496 A1 | * | 5/2007 | Shiraishi et al. ........... | 358/1.14 |
| 2009/0327277 A1 | * | 12/2009 | Sanborn et al. ............ | 707/5 |
| 2010/0030820 A1 | * | 2/2010 | Memon et al. ............. | 707/202 |

OTHER PUBLICATIONS

Smeulders et al ("Content-Based Image Retrieval at the End of the Early Years", IEEE Transactions on Pattern Analysis and Machine Intelligence, vol. 22, No. 12, Dec. 2000).*

Ukovich et al ("System architecture for the digital recovery of shredded documents", Proc. of SPIE vol. 5672 2005).*

* cited by examiner

*Primary Examiner* — Chan S Park  
*Assistant Examiner* — Avinash J Yentrapati

(57) ABSTRACT

Systems and methods to generate data representative of a fragmented document are provided. A particular method includes moving a plurality of pieces of a document that has been fragmented. The method also includes capturing images of the pieces. Each of the images includes at least one side of at least one of the plurality of pieces. The method further includes processing the images to generate a data file including at least a portion of the document where the portion is determined based on image data associated with two or more of the plurality of pieces.

23 Claims, 6 Drawing Sheets

GENERATING DATA REPRESENTATIVE OF A FRAGMENTED DOCUMENT

FIELD OF THE DISCLOSURE

The present disclosure is generally related to systems and methods to generate data representative of a fragmented document.

BACKGROUND

Document shredders provide a relatively inexpensive and secure way to destroy confidential documents. In some instances, the documents may be destroyed to cover unlawful activity. In such instances, investigators may lose access to valuable information in the destroyed documents. Even readily available and inexpensive document shredders are capable of fragmenting documents sufficiently that humans may not reasonably be expected to recover significant information from the documents.

DETAILED DESCRIPTION

Systems and methods to generate data representative of a fragmented document are provided. A particular method includes moving a plurality of pieces of a document that has been fragmented. The method also includes capturing images of the pieces. Each of the images includes at least one side of at least one of the plurality of pieces. The method further includes processing the images to generate a data file including at least a portion of the document the portion determined based on image data associated with two or more of the plurality of pieces.

In another embodiment, a system includes a movement generating device to move a plurality of pieces of a document that has been fragmented with respect to an imaging device. The system also includes the imaging device to capture images of the moving pieces. The system further includes an image processor to process the images to create a data file including at least a portion of the document. The portion of the document includes content identified from image data associated with at least two of the pieces.

Figure 1:
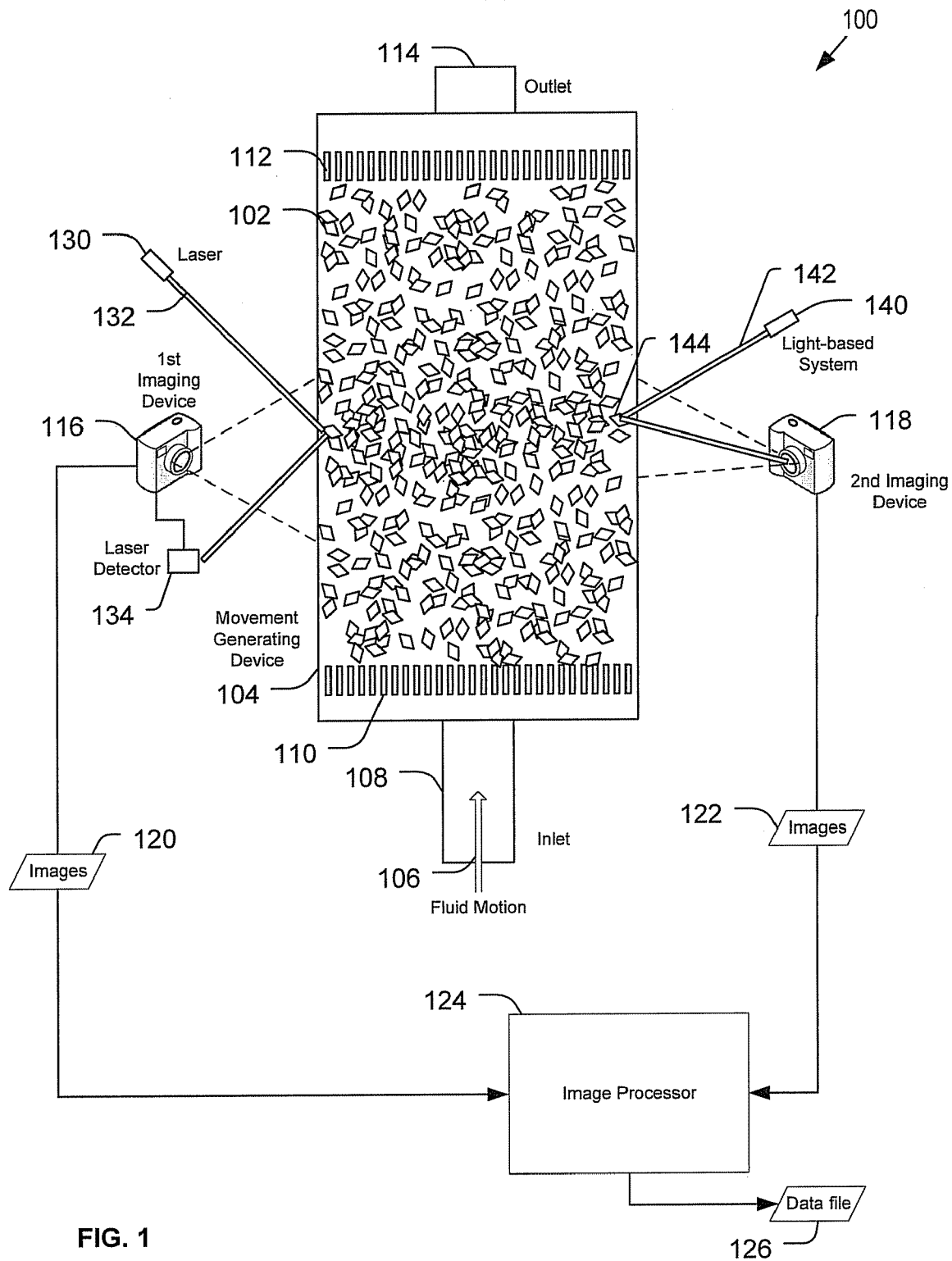
FIG. 1 is a block diagram of a first embodiment of a system to generate data representative of a fragmented document.

FIG. 1 depicts a first particular embodiment of a system to generate data representative of a fragmented document, designated 100. The system 100 includes a plurality of pieces 102 of a document that has been fragmented. For example, the document may have been shredded using a document shredder. In another example, the document may be been torn or otherwise fragmented. The system 100 also includes a movement generating device 104. In a particular embodiment, the movement generating device 104 may use motion of a fluid 106 to move the pieces 102. For example, as illustrated in FIG. 1, the movement generating device 104 may include an enclosure with a first screen 110 to prevent the pieces 102 from falling out of an inlet 108 and a second screen 112 to prevent the pieces 102 from going out of an outlet 114. The fluid 106 (such as air, another gas, or a liquid) may be moved upward from the inlet 108 to the outlet 112 causing the pieces 102 to be moved toward the outlet 114. At particular operating conditions, the pieces 102 may circulate substantially randomly within the enclosure (also called a "bed"). Such an arrangement may be referred to as a "fluidized bed".

In a particular embodiment, the system 100 includes one or more imaging devices, such as a first imaging device 116 and a second imaging device 118. For example, the imaging devices 116, 118 may include digital cameras, video cameras, scanners, or other optical image capture devices. The imaging devices 116, 118 may capture images 120, 122 of the moving pieces 102 in the movement generating device 104. The images 120, 122 may be sent to an image processor 124 as image data. The image processor 124 may process the images 120, 122 to generate a data file 126 and store the data file 126 at a memory device. The data file 126 may include at least a portion of text from the fragmented document. The data file 126 may be generated based on image data associated with at least two of the pieces 102.

The system 100 may also include a triggering device, such as a laser 130 and a laser detector 134. The laser 130 and the laser detector 134 may be arranged so that, when a particular one of the pieces 102 is at a predetermined location with respect to the first imaging device 116, has a predetermined orientation with respect to the first imaging device 116, or both, a beam of light 132 from the laser 130 may be detected by the laser detector 134. The first imaging device 116 may be triggered in response to the laser detector 134 detecting the beam 132. In a particular embodiment, the laser detector 134 detects the beam 132 when a particular piece 102 is facing the first imaging device 116 (as opposed to having an edge toward the first imaging device 116) and is at a location corresponding to a particular set of pixels of the first imaging device 116. In this arrangement, each image 120 captured by the first imaging device 116 has specific pixels that correspond to one of the pieces 102.

In a particular embodiment, the system 100 includes a light based system 140 to highlight a piece 144 in a captured image. For example, the light-based system 140 may shine a light 142 on the piece 144. The light 142 may be reflected to the second imaging device 118 to cause the piece 144 to stand out with respect to other pieces 102 in the captured image 122. To illustrate, the piece 144 or a portion of the piece 144 may fluoresce in response to the light 142. For example, the pieces 102 may be dyed to fluoresce when exposed to the light 142. In another example, edges of the piece 144 may fluoresce more strongly than a field (e.g., the center of the piece 144 or other areas away from the edges) of the piece 144 because the dye may be more strongly concentrated at the edges than in the field.

In a particular embodiment, the light based system 140, the triggering device, or another device may include a sensor to determine characteristics of the pieces 102 as the images 120, 122 are captured. For example, the laser detector 134, the second imaging device 118 or another sensor may include a spectrometer to determine chemical characteristics of the pieces 102. In another example, the laser detector 134, the second imaging device 118 or another sensor may be adapted to determine a gloss or brightness of the piece 144 based on an amount or other characteristics of light reflected from the piece.

The image processor 124 may process the images 120, 122 to identify edges of the pieces 102 in the images 120, 122. Image data associated with identified pieces (e.g., pieces with identified edges) may be processed to recreate the document. For example, shapes of the pieces 102 in the image data may be analyzed to determine how the pieces 102 fit together. In another example, text, images, graphics, or other printed information on the pieces 102 (e.g., portions of letters, symbols or numbers) may be analyzed to determine how the pieces 102 in the image data fit together to form the document. In another example, chemical or physical characteristics of the pieces 102 may be analyzed to determine how the pieces fit together.

The image processor 124 may also perform other analyses to generate the data file 126. For example, the image processor 124 may perform a dictionary analysis to identify words or phrases of which portions are missing in the image data. In another example, a frequency analysis may be performed to determine what word, letter, number or symbol is probably represented by an incomplete portion of the image data. Accuracy of the dictionary analysis, the frequency analysis, or both may be improved based on information provided to the image processor 124 regarding the document or documents from which the pieces 102 are derived. For example, a user may indicate a primary language of the document(s), a type of information or field to which the document(s) relate (e.g., financial information, legal information, etc.). The dictionary analysis, the frequency analysis or both may be adjusted by the image processor 124 based on the user provided information. For example, particular terms may appear more frequently in legal writings than in general writings; thus, the dictionary analysis may be different for a legal document than for a document of general text.

Figure 2:
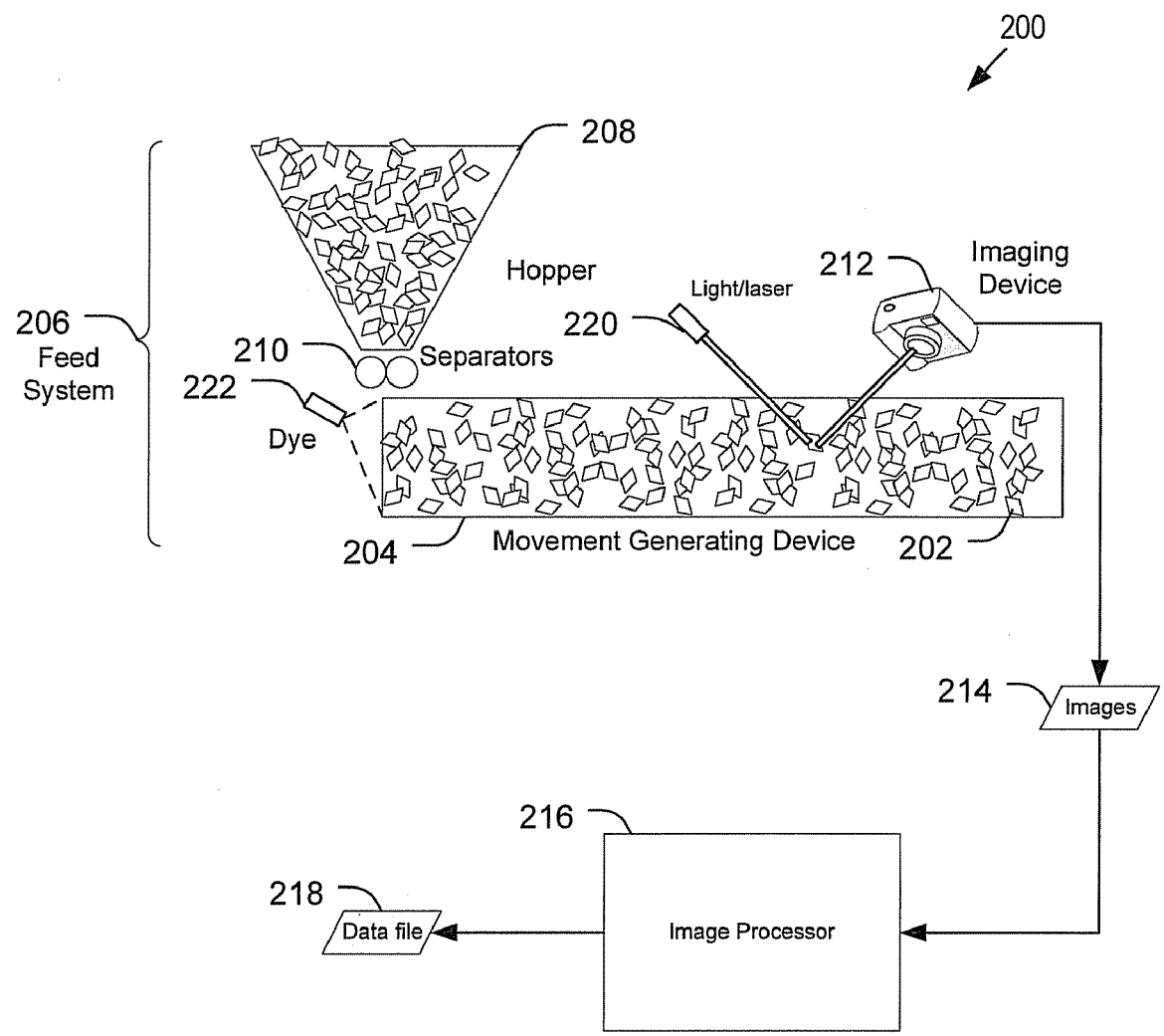
FIG. 2 is a block diagram of a second embodiment of a system to generate data representative of a fragmented document.

FIG. 2 depicts a second particular embodiment of a system to generate data representative of fragmented document, designated 200. The system 200 includes a movement generating device 204 to generated motion of a plurality of pieces 202 of the fragmented document with respect to an imaging device 212. The system 200 also include a feed system 206 to supply the pieces 202 to the movement generating device 204. The feed system 206 includes a hopper 208 and separators 210. The separators 210 may include brushes, static devices, other devices to separated individual pieces, or any combination thereof. In a particular embodiment, the separators 210 separate the pieces 202 so that the pieces are in a single layer (i.e., are not stacked) as they pass by the imaging device 212. The movement generating device 204 may include other features that tend to separate the pieces 202. For example, the movement generating device 204 may be a vibrating conveyor belt that has a static charge. The vibration may tend to break physical bonds between the pieces 202 (such as interlocked edges) and the static charge may attract the pieces 202. Thus, when two pieces are separated by the vibration, they may tend to remain separated due to the static attraction of the conveyor belt.

The imaging device 212 captures images 214 of the pieces 202 and provides the images 214 to an image processor 216. The imaging device 212 may include a camera, a scanner, or another optical device to generate digital image data. The image processor 216 may generate a data file 218 including at least a portion of text of the fragmented document. The data file 218 may include data generated based on two or more of the pieces 202.

The image processor 216 may process the images 214 to identify edges of the pieces 202 in the images 214. Image data associated with identified pieces may be processed to generate data representative of the document. For example, shapes of the pieces 202 in the image data may be analyzed to determine how the piece 202 fit together. In another example, text, images, graphics, or other information (e.g., portions of letters, symbols or numbers) may be analyzed to determine how the pieces 202 in the image data fit together to form the document or documents. Other analyses may also be performed to generate the data file 218. For example, a dictionary analysis may be performed to identify words or phrases of which portions are missing in the image data. In another example, a frequency analysis may be performed to determine what word, letter, number or symbol is probably represented by an incomplete portion of the image data.

In a particular embodiment, the system 200 includes laser/light source 220. The laser/light source 220 may be used to determine characteristics of the pieces 202 as the images 214 are captured. For example, the laser/light source 220 may be used to determine chemical characteristics of the pieces 202. In another example, the laser/light source 220 may be used to determine a gloss or brightness of the pieces 202 based on an amount or other characteristics of light reflected from the pieces 202. The laser/light source 220 may also be used to identify edges of the pieces 202 in the images 214. For example, a dye 222 may be applied to the pieces 202. The dye 22 may fluoresce when exposed to the light from the laser/light source 220. Since the dye 222 may be absorbed more quickly at the edges of the pieces 202, the fluorescence of the dye 222 may be used to identify edges of the pieces 202.

Figure 3:
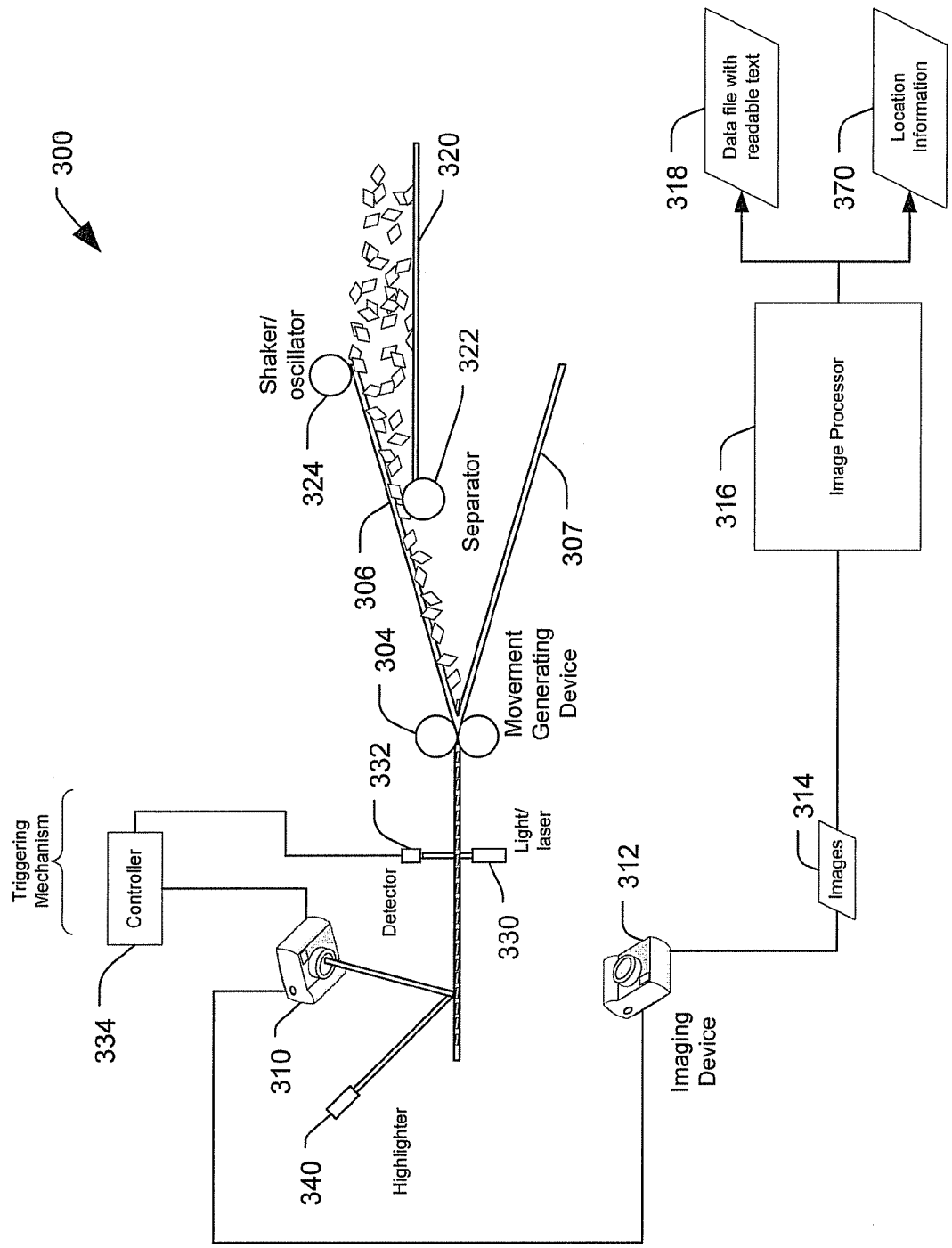
FIG. 3 is a block diagram of a third embodiment of a system to generate data representative of a fragmented document.

FIG. 3 depicts a third particular embodiment of a system to generate data representative of a fragmented document, designated 300. The system 300 includes a movement generating device 304 to move a plurality of pieces 302 of the fragmented document relative to one or more imaging devices, such as a first imaging device 310 and a second imaging device 312. In a particular embodiment, the movement generating device 304 includes one or more rollers to move a film 306. The film 306 may include an adhesive that bonds to the pieces 302 as the film 306 moves past them. In another example, the film 306 may have a static charge that attracts the pieces 302. The movement generating device 304 may also includes device to separate the pieces so that the pieces stick to the film 306 in a single layer. For example, the system 300 may include a shaker or oscillator 324 to shake loose pieces 102 that are not stuck directly to the film 306. In another example, the system 300 may include a separator 322, such as a brush that physically pulls pieces 302 that are stuck together away from one another. The separator 322 may also act to smooth out the pieces 302 against the film 306. For example, when the pieces 302 are elongated, as may be the case when a document is shredded by particular types of document shredders, smoothing the pieces 302 against the film may minimize twists, lumps or folds in the pieces 302 on the film 306.

In a particular embodiment, the system 300 includes a feed system to feed the pieces 302 may be feed to the movement generating device 304 to keep a relatively even contact between pieces and the film 306. For example a table or belt 320 may move the pieces 302 toward the film 306.

In a particular embodiment, a second layer of film 307 may be merged with the film 306 to laminate the pieces 302 as they move through the movement generating device 304. In a particular embodiment, the film 306 and the second film 307 are transparent so that the first imaging device 310 and the second imaging device 312 can capture images 314 of each side of the pieces at substantially the same time. In this arrangement, there is no need to ensure that the pieces 302 are faced in a particular direction. This arrangement also ensures that when the document has text on both sides of a page, image data related to both sides of each piece 302 is captured. Additionally, when the images 314 associated with two sides of a piece are captured, the images 314 may be tagged as associated with a particular piece and/or with each other.

The system 300 may also include a triggering mechanism. The triggering mechanism may trigger the imaging devices 310, 312 to capture the images 314 when one or more of the pieces 302 has a particular position with respect to the imaging devices 310, 312. For example, the triggering mechanism may include a laser or light source 330 and a detector 332. The laser or light source 330 may shine on the detector 332 except when one of the pieces 302 passes between them. When the detector 332 indicates that a piece 302 is between the detector 322 and the laser or light source 330, the detector 332 may send a signal to a controller 334. Based on when the signal from the detector 332 is received and a movement speed of the pieces 302 along the movement generating device 304, the controller 334 may trigger capturing of the images 314 by the imaging devices 310,312.

In a particular embodiment, the film 306, 307 may be indexed in a manner that facilitates finding particular pieces 302 to enable physically reassembling the document. For example, locations 370 of pieces on the film 306, 307 may be stored along with the images 314. After the images 314 are processed and locations 370 of the pieces 302 with respect to one another have been determined electronically (e.g., to create the data file 314) location information 370 may be used to generate a map or table that shows which of the pieces 302 fit where in the document and indicates where each piece is along the film 306. The film 306 may be index by applying a mark or other identifier on the film 306, or coupling an identifier to the film 306 (e.g., sticking a tag to the film 306 along with the pieces 302). Alternately, the film 306 may be marked before use in the system 300. For example, the film 306 may be manufactured with index marks that are detectable in the images 314.

The system 300 may also include a highlighter 340. The highlighter 340 may cause image data associated with a particular piece in an image 314 to be distinguishable from other pieces 302. In another embodiment, the highlighter 340 increases detectability of edges of one or more pieces 302 in the image 314. For example, the highlighter may include an ultraviolet light that causes dye applied to the pieces 302 to fluoresce.

In a particular embodiment, the imaging devices 310, 312 may be offset, such that each capture image data of a side of a particular piece at a different time. Lighting (such as the highlighter 340) may be arranged so that a side of the piece being imaged is lighted and the film 306, 307 around the particular piece contrasts with the piece. This arrangement may provide for the edges of the piece to contrast with the film 306, 307 to increase detectability of the edges.

The image processor 316 may process the images 314 to identify edges of the pieces 302 in the images 314. Image data associated with identified pieces may be processed to recreate the document. For example, shapes of the pieces in the image data may be analyzed to determine how the pieces fit together. In another example, text, images, graphics, or other information (e.g., portions of letters, symbols or numbers) may be analyzed to determine how the pieces 302 in the image data fit together to form the document. Other analyses may also be performed to generate the data file 314. For example, a dictionary analysis may be performed to identify words or phrases of which portions are missing in the image data. In another example, a frequency analysis may be performed to determine what word, letter, number or symbol is probably represented by an incomplete portion of the image data.

Figure 4:
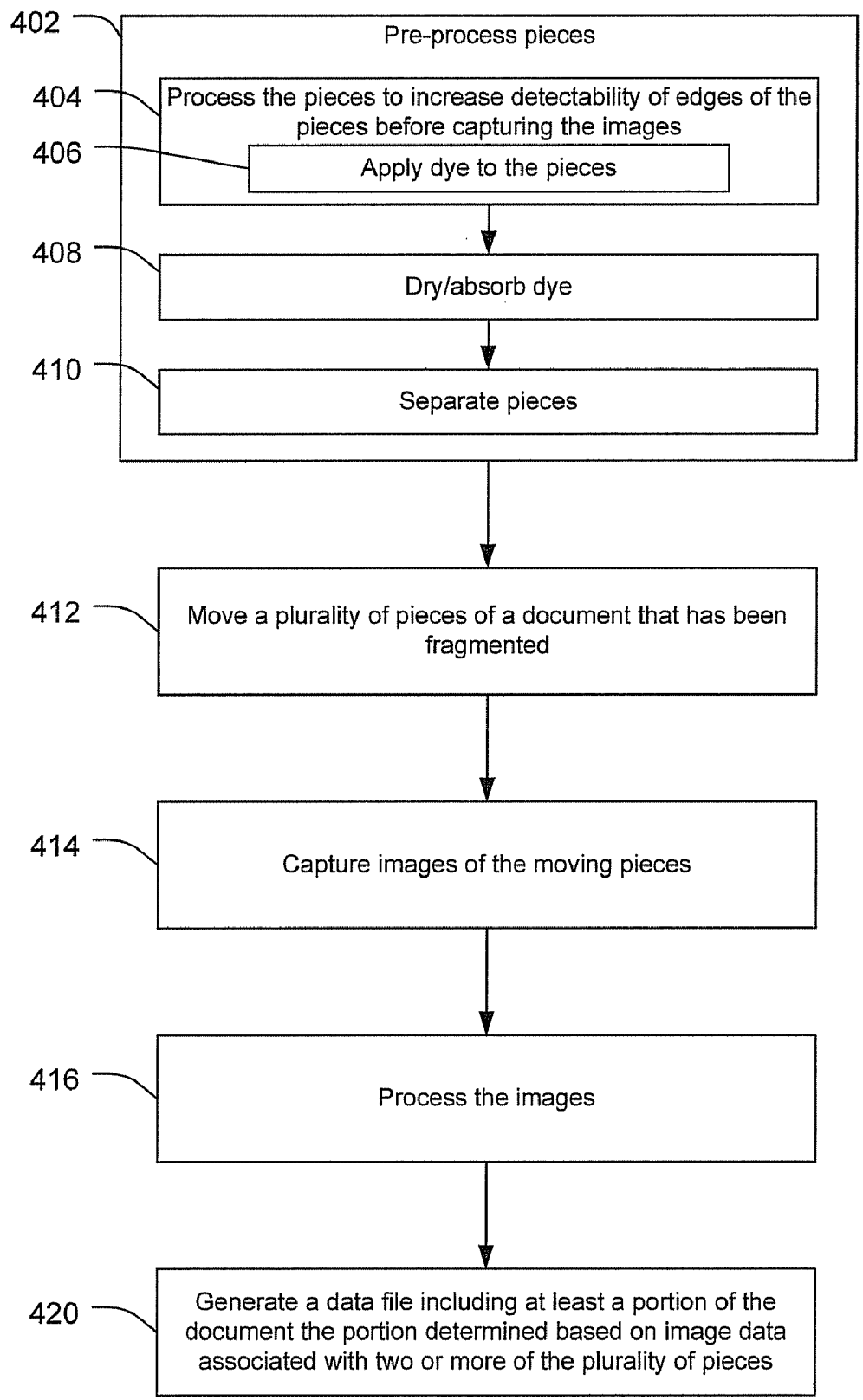
FIG. 4 is a flow chart of an embodiment of a first particular embodiment of a method of generating data representative of a fragmented document.

FIG. 4 is a flow chart of a first particular embodiment of a method of generating data representative of a fragmented document. The method includes, at 402, pre-processing pieces of the fragmented document. In a particular embodiment, pre-processing the pieces of the fragmented document includes, at 404, processing the pieces to increase detectability of the edges of the pieces. For example, dye may be applied to the pieces, at 406. In an illustrative embodiment, the dye absorbs more quickly at the edges pieces than at the center, thus increasing detectability of the edge of the pieces. The dye may be selected to prevent the dye from obscuring print on the document. For example, the dye may be invisible under certain frequencies of light, but visible under other frequencies of light. In another example, the dye may fluoresce when exposed to certain frequencies of light.

The method may also include, at 408, allowing the dye to absorb or dry as needed. The method may further include, at 410, separating the pieces. For example, the pieces may be separated using a physical process, an electrostatic process, or any combination thereof.

The method may also include, at 412, moving the plurality of pieces of the document with respect to an image capture device. To illustrate, the pieces may be moved via a conveyor system, via motion of a fluid, or using another device to move the pieces with respect to the image capture device. In an illustrative embodiment, the movement of the pieces is substantially random. For example, the pieces may be suspended by motion of a fluid while constrained in a container.

The method also includes, at 414, capturing images of the moving pieces. The images may be captured periodically, randomly, pseudo-randomly, or occasionally in some other manner. For example, a plurality of images of the pieces may be captured without regard to the location or orientation of any particular piece. In another particular embodiment, one or more of the images may be captured in response to a triggering event. For example, the image capture device may be responsive to a controller that detects when a piece is located or oriented in a particular manner. To illustrate, a triggering device may be used to determine when to capture an image. The triggering device may include a light detector which is oriented to detect light reflected from a particular piece when the particular piece has a desired location, a desired orientation, or both.

In a particular embodiment, a particular piece may be highlighted in an image captured by the image capture device using a light-based device. For example, the light-based device may include a directional light source (such as a laser). The directional light source may be directed to a particular location within the view of the image capture device. The directional light source may reflect from a piece at the particular location in a manner that causes image data associated with the particular piece (e.g., data captured by particular pixels) be distinguishable from other image data of a captured image. In another example, the directional light source may cause dye on the particular piece to fluoresce. In a particular embodiment, a single device may act as both the triggering device and the light-based device. In another embodiment, the triggering device and the light-based device are separated devices.

The method also includes, at 416, processing the images. The processed images may be used to generate a data file including at least a portion of the document, at 420. The portion of the document in the data file may be determined based on image data associated with two or more of the pieces. For example, image data associated with two or more of the pieces may be stitched together to generate the portion of the document. In a particular embodiment, the data file may include a text document (rather than an image document). The text document may be generated using a pattern recognition system to process the image data to recognize text or characters of the text. In a particular embodiment, the pattern recognition system may interpolate missing portions of the data. For example, where a portion of a letter is missing, the pattern recognition system may make a best guess as to what the letter is, and analyze text generated using the "best guess" to estimate a probability that the guess is correct. The probability estimate may be reported to a user to give the user an indication of how accurately the data represents the document. The pattern recognition system may also use frequency analysis or dictionary analysis to attempt to fill in missing portions of the text.

Figure 5:
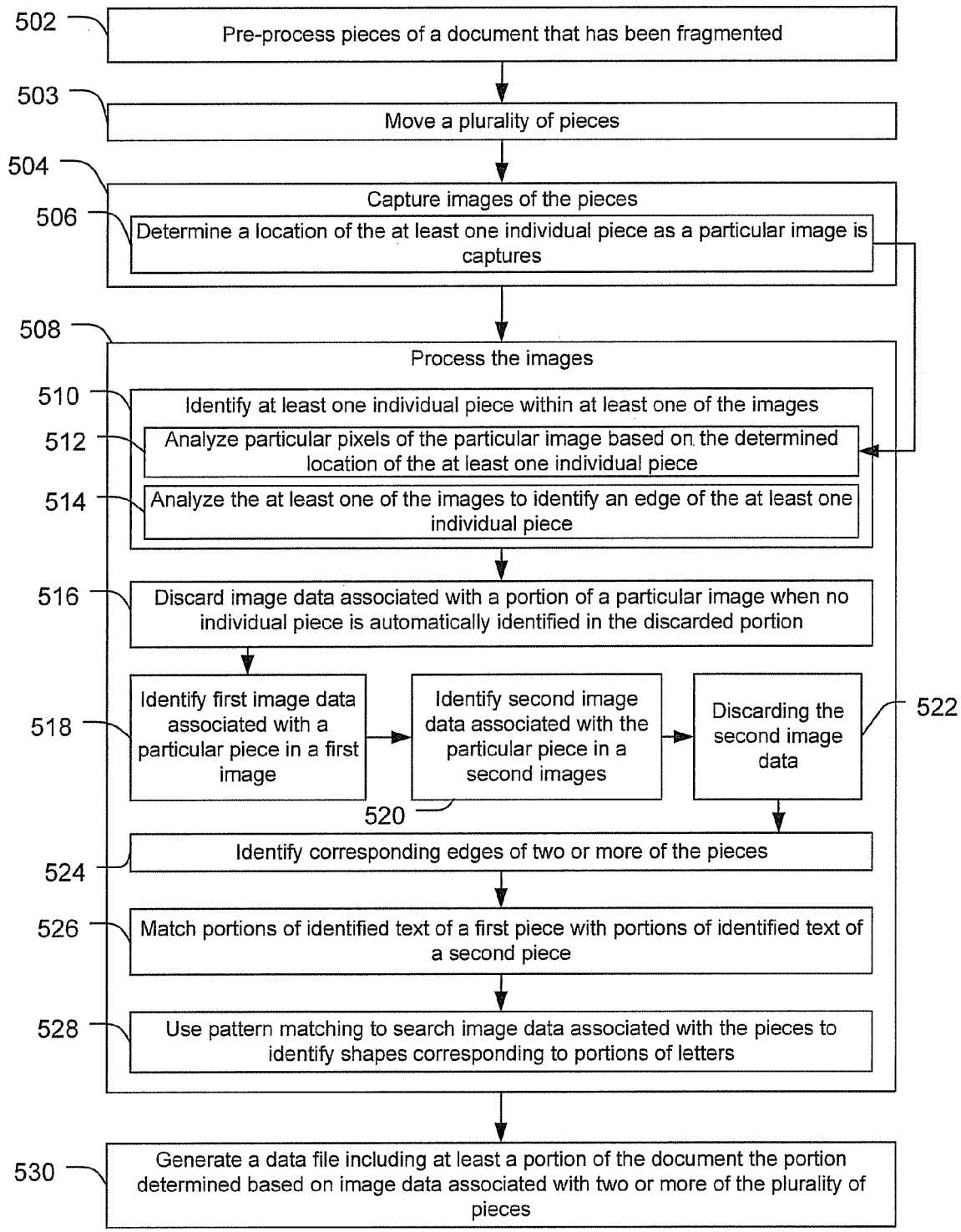
FIG. 5 is a flow chart of an embodiment of a second particular embodiment of a method of generating data representative of a fragmented document.

FIG. 5 depicts a flow diagram of a second particular embodiment of a method of generating data representative of a fragmented document. The method may include, at 502, pre-processing pieces of the fragmented document. For example, the pieces maybe processed to separate them from one another. In another example, the pieces may be treated to increase the detectability of the edges of the pieces.

In a particular embodiment, the method includes, at 503, moving the plurality of pieces. The method also includes, at 504, capturing images of the pieces. For example, the images may be captured as the pieces are moved. Alternately, movement of the pieces may be stopped as the images are captured. In a particular embodiment, a location of at least one individual piece may be determined as a particular image is captured, at 506. For example, the image may be captured in response to determining that a piece has a particular position with respect to an image capture device. To illustrate, a triggering device may be arranged such that, as a piece reaches a particular position, the triggering device triggers the image capture device to capture an image. The particular position may correspond to a particular set of pixels of the image capture device.

In a particular embodiment, the image capturing may be halted based on an estimate of the number of pieces. For example, the number of pieces may be estimated based on an average size and weight of the pieces and a weight of all of the pieces together. When the images are captured while the pieces are in substantially random motion (e.g., in a fluidized bed) a statistical estimate may be made of when an image of each piece is likely to have been captured based on the estimated number of pieces, the motion of the pieces, an number of pieces per image, and so forth. Halting the image capturing when the statistical estimate is reached may reduce the number of duplicate images that are processed.

The method also includes, at 508, processing the images. Processing the images may include, at 510, identifying at least one individual piece within at least one of the images. For example, when the location of the individual piece was determined as a particular image was captured, the location may be correspond to particular pixels of the image capture device. The method may include, at 512, analyzing the particular pixels of a particular image based on the determined location. In another example, the method includes, at 514, analyzing at least one image to identify edges of at least one individual piece. In a particular embodiment, the edge may be detected using an optical edge detection technique. In an illustrative embodiment, the edges of the pieces contrast with a field of the pieces as a result of a dye having been applied to the pieces. In another illustrative embodiment, the images are captured against a background that contrasts with the pieces to improve detection of the edges.

The method may further include, at 516, discarding image data associated with a portion of a particular image. For example, an image may be processed to identify pixels associated with individual pieces. The pixels in which a piece is identified may be stored as image data. The portions of the image in which no piece is automatically identified may be discarded.

In a particular embodiment, the method includes discarding image data that includes a duplicate image of a particular piece. For example, the method may include, at 518, identifying first image data associated with a particular piece in a first image, and, at 520, identifying second image data associated with the particular image in a second image. That is, the second image data may be a duplicate image of the particular piece. At 522, the second image data associated with the particular piece may be discarded.

Processing the images may also include, at 524, identifying corresponding edges of two or more pieces. For example, after edges of the pieces in the images have been identified, image data associated with the pieces may be processed to determine whether adjacent pieces of the document can be identified based on a shape of the edges. To illustrate, some methods of fragmenting the document may result in a kerf between the pieces. A kerf is a portion of a cut that corresponds to the width of a blade used to make the cut. For example, shredding the document using a document shredder may result in a kerf between the pieces of the document. The portion of the document within the kerf may be torn into dust, and thus may be too small to process. However, pieces on either side of the kerf may still correspond in shape to one another. Thus, the edges may be matched to recreate the document except for the kerf portion. In another illustrative example, the document may have been fragmented using a method that does not create a kerf, such as tearing. When no kerf is created, the document may be recreated without portions missing between the pieces. The edges of the pieces may be processed to identify corresponding shapes of the edges to identify adjacent pieces.

Processing the images may also include, at 526, matching portions of identified text of a first piece with portions of identified text of a second piece. For example, when the pieces are large enough to include one or more one or more recognizable portions of text, dictionary analysis may be used to complete words of phrases to identify adjacent pieces of the document. To illustrate, where a first piece includes the text "Missi" and a second piece includes the text "ssippi", the first piece and second pieces may be determined to be an adjacent pieces when no other combination of text from other pieces would make a complete word. Note that if a third piece included the text "on", "Missi" could be a part of the word "Mississippi" or a part of the word "Mission". However, "ssippi" would not match another common word; thus, the first and second pieces may be determined to be adjacent, and the third piece may be matched to another piece. In some cases, portions of text from multiple pieces may fit as adjacent pieces to a particular piece. In such cases, other techniques may be used to supplement the dictionary analysis. For example, the edges of the pieces may be matched, or the orientation or alignment of the text on each piece may be analyzed to determine which pieces are adjacent pieces.

Processing the images may also include, at 528, using pattern matching to search image data associated with the pieces to identify shapes corresponding to portions of letters. For example, the English alphabet includes 26 letters. Additionally, various symbols and number may be used in English language text. Portions of letters, symbols or numbers that are identified in the image data may be compared to the various letters, number and symbols used in English to determine which one or more correspond to the shapes on the piece. The portion of the text may also be examined to see whether the font used on two or more pieces is different. Differences in the font may indicate that the pieces are not adjacent.

The method may also include, at 530, generating a data file that includes at least a portion of the document. The portion of the document in the data file may be determined based on two or more of the plurality of pieces. In a particular embodiment, the data file is an image file. For example, image data associated with two or more adjacent pieces may be stitched together to generated the data file. In another particular embodiment, the data file is a text file. That is, text recognized from the pieces may be saved in the text file. The data file may also include data not identified in any piece. For example, where a portion of a word was not specifically identified, the method may include a dictionary analysis, a frequency analysis, another text or data analysis, or any combination thereof. A dictionary analysis may use a data compilation of a particular language to fill in missing portions of the document based on a how likely various words are to appear with one another, or what word or words a set or letters may represent. A frequency analysis may determine what a word probably is based on a known frequency of use of various words or letters in the particular language.

In a particular embodiment, text in the data file is sorted to approximate the location of the text within the document. For example, the pieces may include pieces from more than one document. To illustrate, when a document shredder has been used, many pages may be together in a catch bin of the document shredder before the pieces are processed. If the document shredder generates relatively small pieces, such as a cross-cut shredder may do, the pieces may be intermixed and many of the pieces may be blank (e.g., because these pieces include spaces between lines of text or margins of the documents). Since letters may be closer to one another horizontally that vertically on a page, it may be easier to determine text of individual lines than to identify where the lines fall in the document with respect to one another. Thus, the method may include sorting the lines of text within the data file. The sorting may be performed based upon a subject matter of the text, font information of the text, or other information that can be determined by optical examination of the pieces to reveal differences between pieces. For example, where a first line of text includes an 8 point font, a second line of text includes the 8 point font, and a third line of text includes a 12 point font, the method may assume that the first and second lines of text fall in the document closer to one another than to the third line of text. Other common document formatting arrangements may also be considered by the method to arrange the lines of text. Arranging the lines of text may also include separating the text into pages. For example, the third line may be assumed to be from a second page of text associated with a second document, whereas the first line and second line may be from the same document. A number of lines per page may be estimated based on information known about the document. For example, where the document was created in the United States, a page size of 8.5 inches by 11 inches may be assumed. In another example, when the document was created in Europe, an A4 page size may be assumed.

Characteristics of the pieces may also be used to determine the relationship of the lines of text. For example, the method may include determining characteristics of the ink, paper or processing used to generate the document. To illustrate, optical or chemical characteristics of the pieces may be analyzed to determine which pieces are from the same or similar documents. In a particular embodiment, light reflected from the pieces to trigger image capture or to determine the location or orientation of a piece with respect to the image capture device(s) may be analyzed to determine optical or chemical characteristics of the pieces. To illustrate, an amount of light reflected may indicate whether each piece came from a glossy document or not. Additionally, the brightness of paper used for each document, a color of ink used, or other optically detectable characteristics may be determined based on the reflected light. In a particular embodiment, chemical characteristics of the pieces may be determined based on the reflected light. For example, a spectrum of the reflected light may be determined to identify chemical characteristics of the paper. The spectrum determined for various pieces may be matched to other pieces to assist in assembling lines of text (e.g., to identify adjacent pieces) or to determine where lines fall in relation to one another (e.g., on the same page, or on different pages).

Other information that is known about the document or documents may also be provided to the image processor to generate the data file. For example, where the documents are known to have been generated by a particular person or group of people, information related to the person or group of people may be provided to the image processor. To illustrate, when the documents were generated by a law firm, a specialized dictionary may be provided to the image processor since documents generated by law firms may include terms that are not common in other documents. The frequency analysis used may also be different depending on the nature or source of the documents.

In a particular embodiment, user provided information may be used to determine whether to process certain pieces or not. For example, the user may indicate that only image data associated with torn pieces and not image data associated with shredded pieces is to be analyzed. In another example, when the user is looking for particular information, processing of the image data may be halted when the particular information has been identified. To illustrate, when the user is processing the pieces to determine particular information, search terms may be provided to the image processor. When the search terms are identified in the document, processing of the image data may be halted, and the user may be alerted that the search terms have been found.

Figure 6:
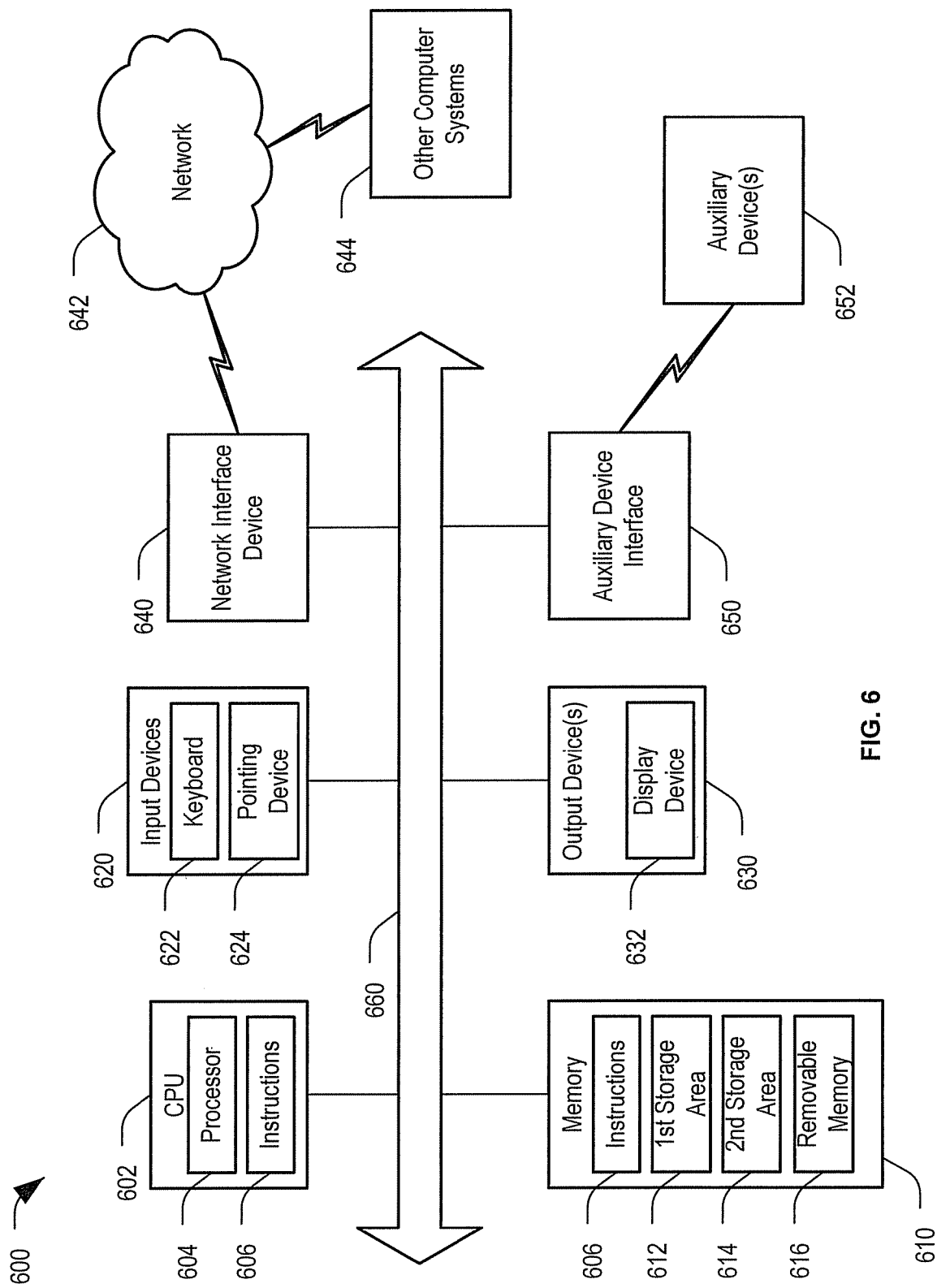
FIG. 6 is a block diagram of an illustrative general computer system.

FIG. 6 is a block diagram of a particular computer system 600 suitable for carrying out processing in accordance with one embodiment of a method of generating data representative of a fragmented document. In a particular embodiment, one or more of the methods to generate data representative of a fragmented document disclosed herein, or portions thereof may be implemented using a set of instructions executable by one or more processors. In another particular embodiment, one or more of the systems to generate data representative of a fragmented document disclosed herein, or portions thereof, may include a computer system including instructions executable by one or more processors. For example, the computer system 600 may include, or be included within, one or more of the imaging devices, triggering mechanisms, image processors or controllers, as discussed with reference to FIGS. 1-3. The computer system 600 can also be implemented as or incorporated into various other devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. Further, while a single computer system 600 is illustrated, the term "system" includes any collection of systems or subsystems that individually or jointly execute a set, or multiple sets, of instructions to perform one or more computer functions.

While FIG. 6 illustrates one embodiment of the particular computer system 600, other computer systems or computing architectures and configurations may be used for carrying out the methods of generating data representative of a fragmented document disclosed herein. The computer system 600 includes at least one microprocessor subsystem (also referred to as a central processing unit, or CPU) 602. The CPU 602 can be implemented using a single-chip processor or using multiple processors. In a particular embodiment, the CPU 602 is a programmable digital processor which controls the operation of the computer system 600. For example, using instructions 606 retrieved from a memory 610, the CPU 602 controls the reception and manipulation of input data, and the generation of output data (e.g., to a display or other output device). The CPU 602 may interact with other components or subsystems of the computer system 600 via a bus 660. The bus 660 is illustrative of any interconnection scheme serving to link the subsystems of the computer system 600, external subsystems or device, or any combination thereof.

The CPU 602 may be coupled to the memory 610. The memory 610 may include any suitable computer-readable storage media depending on, for example, whether data access needs to be bi-directional or unidirectional, speed of data access desired, memory capacity desired, other factors related to data access, or any combination thereof. The memory 610 may include various memory devices, such as registers, caches, volatile memory, and non-volatile memory. For example, the memory 610 can include cache accessible by the CPU 602 to rapidly retrieve and store frequently needed data. The memory 610 can also include one or more storage areas, such as a first storage area 612 and a second storage area 614 In a particular embodiment, the first storage area 612 may include random access memory (RAM), and the second storage area 614 may include a read-only memory (ROM). The storage area(s) 612, 614 may include operating instructions 606 (e.g., program code) and, data used by the CPU 602 to perform its functions.

In a particular embodiment, the memory 610 may also include a removable storage device 616 to provide additional data storage capacity. The removable storage device 616 may be coupled either bi-directionally or unidirectionally to CPU 602 via the bus 614. For example, a specific removable storage device 616 commonly known as a CD-ROM may pass data unidirectionally to the CPU 602, whereas other specific removable storage devices 616 may pass data bi-directionally to the CPU 602 (e.g., a Universal Serial Bus (USB) flash memory). In various embodiments, the removable storage device 616 may include computer-readable storage media such as magnetic tape, flash memory, PC-CARDS, portable mass storage devices, optical or holographic storage devices, magnetic or electromagnetic storage devices, and other storage devices. Like the storage area(s) 612, 614, the removable storage device 612 may include operating instructions 606 (e.g., program code) and, data used by the CPU 102 to perform its functions.

In addition to providing CPU 602 access to storage subsystems, the bus 614 can be used to provide access to other subsystems and devices as well. These can include, for example, output devices 630, input device 620, a network interface device 640 and an auxiliary device interface 650. The output devices 630 may include a display device 632, speakers, a printer, a television, a projector, or another device to provide an output of data in a manner that is perceptible by a user. The network interface device 640 may include a wireless network interface, a modem, a Ethernet interface, or another device to output data to or to receive data from another computer system 644 or other machine via a network 643. The input devices 620 may include a keyboard 622, a pointing device 624, a biometric device, a microphone, a motion sensor, or another device to sense or receive user input. In various embodiments, the pointing device 624 includes a mouse, a stylus, a track ball, a pen, a touch pad, a touch screen, a tablet, another device that is useful for interacting with a graphical user interface, or any combination thereof. The auxiliary device interface 650 may couple to auxiliary devices 652 such as, a sound card, a video card, a graphics processing unit (GPU), or any combination thereof.

The network interface device 640 allows the CPU 602 to be coupled to one or more other computers 644, computer networks 642, or other networks using a computer communications protocol. For example, the computer system 600 may receive information (e.g., data objects or program instructions) from the other computer system 644, or may output information to the other computer system 644 through the network interface device 640. Information, such as a set of instructions 606 to be executed at a CPU (e.g., the CPU 602), may be received from or outputted to the other computer system 644 in the form of a computer data signal embodied in a carrier wave. The network interface device 640 can be used to transfer data according to standard protocols (such as, TCP/IP, UDP/IP, HTML, HTTP, DHCP, FTP, SMTP, POP3, and IMAP). Thus, for example, in various embodiments, methods of generating data representative of a fragmented document may executed by the computer system 600 alone, or may be performed in a distributed manner by the computer system 600 working in conjunction with one or more other computer systems 644 via the network 642. In a particular embodiment, the network 642 is a wide area network (WAN), such as the Internet, an intranet network, a WiFi network, or a telecommunication network. In other embodiments, the network 642 includes a local area network (LAN), such as an intranet network, or an 802.11x wireless network. Additionally, at least a portion of the memory 610 may be connected to CPU 602 through the network interface device 640.

The computer system 600 may be coupled to one or more auxiliary devices 652 via the auxiliary device interface 650. The auxiliary device interface 650 can include standard interfaces or custom interfaces that allow the CPU 602 to send and/or receive data from auxiliary devices 652 (such as, personal digital assistants, cameras, and the like). Examples of standard auxiliary device interfaces include USB ports, IEEE 1284 ports, IEEE 1394 ports, serial ports, parallel ports, PS/2 ports, DVI ports, SCSI ports, among others.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present disclosure encompasses software, firmware, and hardware implementations.

In addition, embodiments disclosed herein relate to computer storage products with a computer-readable storage medium that includes instructions (e.g., program code and data) for performing various computer-implemented operations. The computer-readable storage medium can include any data storage device that can store data which can thereafter be read by a computer system, such as the computer system 600. Examples of computer-readable media include, but are not limited to: magnetic media, such as hard disks, floppy disks, and magnetic tape; optical media, such as CD-ROM disks; magneto-optical media, such as floptical disks; and specially configured hardware devices, such as application-specific integrated circuits (ASICs), programmable logic devices (PLDs), and ROM and RAM devices.

Although components and functions described herein have referred to particular standards and protocols, the embodiments disclosed are not limited to such standards and protocols. For example, standards for Internet and other packet switched network transmission (e.g., TCP/IP, UDP/IP, HTML, HTTP, and so forth) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method, comprising:
    using motion of a moving fluid to circulate multiple pieces of a document due to contact between the moving fluid and the multiple pieces of the document that has been fragmented within an enclosure;
    as the pieces are circulating, capturing images of the pieces, wherein each of the images includes at least one side of at least one of the pieces; and
    processing the images to generate a data file including at least a portion of the document, the portion determined based on image data associated with two or more of the pieces.

2. The method of claim 1, wherein the data file includes readable text of the document recreated based on the images.

3. The method of claim 1, wherein the document includes text printed on both sides of a printed medium, the method further comprising generating at least one second data file, wherein the data file includes text of a first side of the printed medium and the second data file includes text of a second side of the printed medium.

4. The method of claim 1, wherein processing the images includes identifying at least one individual piece within at least one of the images, the method further comprising determining a location of the at least one individual piece as a particular image is captured, wherein identifying the at least one individual piece includes analyzing particular pixels of the particular image based on the determined location of the at least one individual piece.

5. The method of claim 1, wherein processing the images includes:
    identifying first image data associated with a particular piece in a first image;
    identifying second image data associated with the particular piece in a second images; and
    discarding the second image data.

6. The method of claim 1, further comprising discarding image data associated with a portion of a particular image when no individual piece is automatically identified in the discarded image data.

7. The method of claim 1, further comprising processing the pieces to increase detectability of edges of the pieces before capturing the images.

8. The method of claim 7, wherein processing the pieces to increase the detectability of the edges includes applying dye to the pieces, wherein the edges of the pieces absorb more of the dye to increase detectability of the edges.

9. The method of claim 8, wherein the dye is fluorescent.

10. The method of claim 8, wherein the dye does not obscure visibility of printed matter on the pieces in the captured images.

11. The method of claim 1, wherein processing the images includes identifying corresponding edges of two or more of the pieces.

12. The method of claim 1, wherein processing the images includes matching portions of identified text of a first piece with portions of identified text of a second piece.

13. The method of claim 1, wherein processing the images includes using pattern matching to search image data associated with the pieces to identify shapes corresponding to portions of letters.

14. A system, comprising:
   a movement generating device to move a fluid relative to multiple pieces of a document that has been fragmented to circulate the pieces using contact with the fluid within an enclosure with respect to an imaging device;
   the imaging device to capture images of the pieces as the pieces circulate; and
   an image processor to process the images to create a data file including at least a portion of the document, the portion including content identified from image data associated with at least two of the pieces.

15. The system of claim 14, further comprising a light-based system to highlight at least one of the pieces within at least one of the images.

16. The system of claim 14, further comprising a triggering mechanism to cause the imaging device to capture an image in response to a determination that a piece is at a predetermined location with respect to the imaging device.

17. The system of claim 14, further comprising a laser and a laser detector arranged such that the laser reflects onto the laser detector when the laser is shined on a piece that is oriented in a predetermined manner with respect to the imaging devices.

18. A method comprising:
   receiving image data, wherein the image data includes images of pieces of a document that has been fragmented, the images captured while the pieces are circulating in an enclosure due to contact with a moving fluid, wherein each of the images includes at least one side of at least one of the pieces; and
   processing the images to generate a data file including at least a portion of the document, the portion determined based on image data associated with two or more of the pieces.

19. The method of claim 18, wherein processing the images includes analyzing chemical characteristics associated with the two or more of the pieces.

20. The method of claim 18, wherein processing the images includes performing a dictionary analysis to identify words or phrases that are not complete in the image data.

21. The method of claim 18, wherein processing the images includes performing a frequency analysis to identify an incomplete portion of image data.

22. The method of claim 18, wherein processing the images includes:
   identifying first image data associated with a particular piece in a first image;
   identifying second image data associated with the particular piece in a second images; and
   discarding the second image data.

23. The method of claim 22, further comprising applying dye to the pieces, wherein the edges of the pieces absorb the dye increasing detectability of the edges.

* * * * *